W. P. DEVINE.
APPARATUS FOR COVERING EYEGLASS CASES.
APPLICATION FILED MAR. 18, 1908.

1,049,344.

Patented Jan. 7, 1913.

4 SHEETS—SHEET 1.

WITNESSES:

INVENTOR
WILLIAM P. DEVINE
BY
ATTORNEYS

W. P. DEVINE.
APPARATUS FOR COVERING EYEGLASS CASES.
APPLICATION FILED MAR. 18, 1908.
1,049,344.
Patented Jan. 7, 1913.
4 SHEETS—SHEET 2.
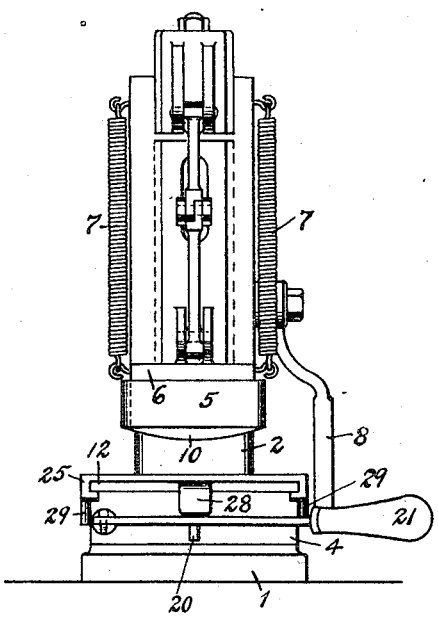
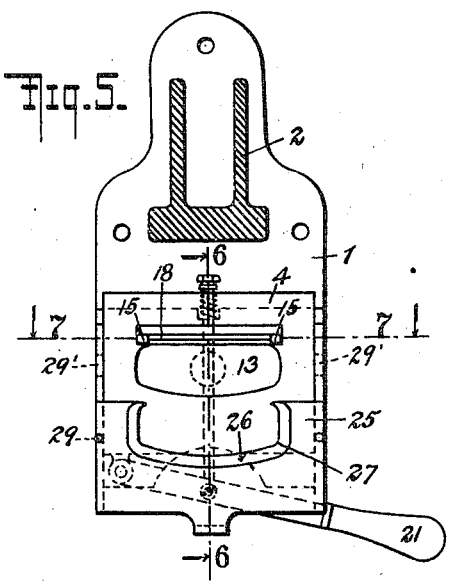
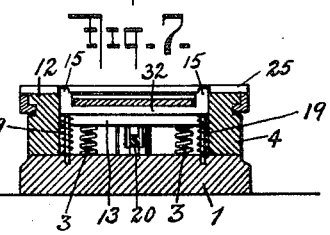
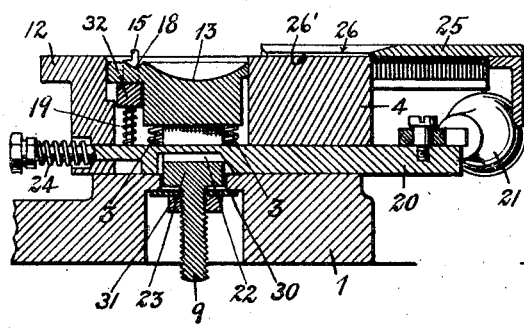
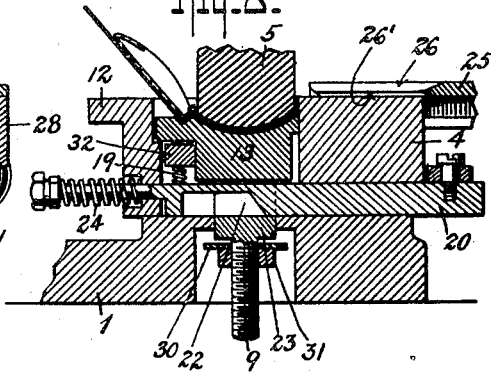
WITNESSES:
INVENTOR
WILLIAM P. DEVINE
BY
ATTORNEYS W. P. DEVINE.
APPARATUS FOR COVERING EYEGLASS CASES.
APPLICATION FILED MAR. 18, 1908.
1,049,344.
Patented Jan. 7, 1913.
4 SHEETS—SHEET 3.
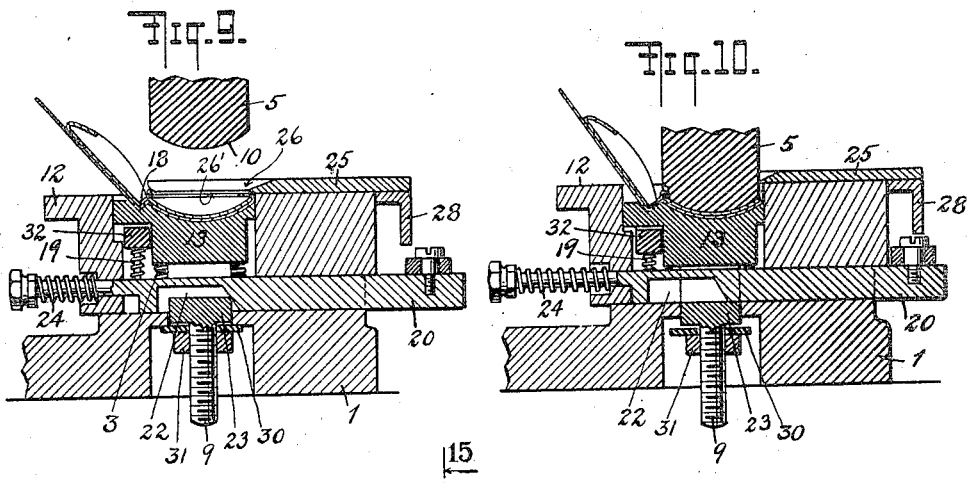
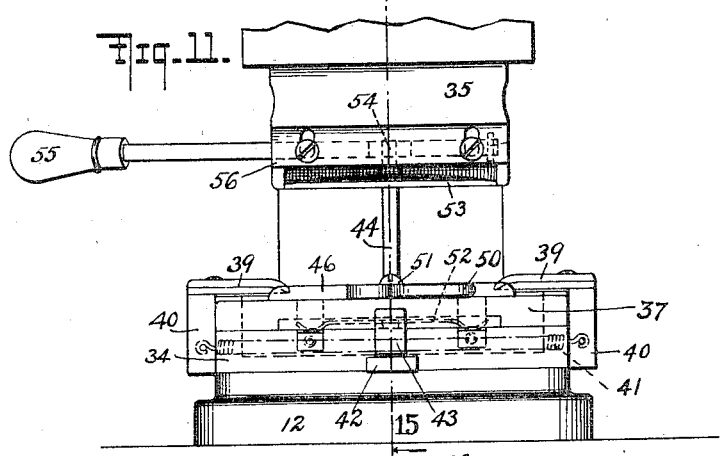
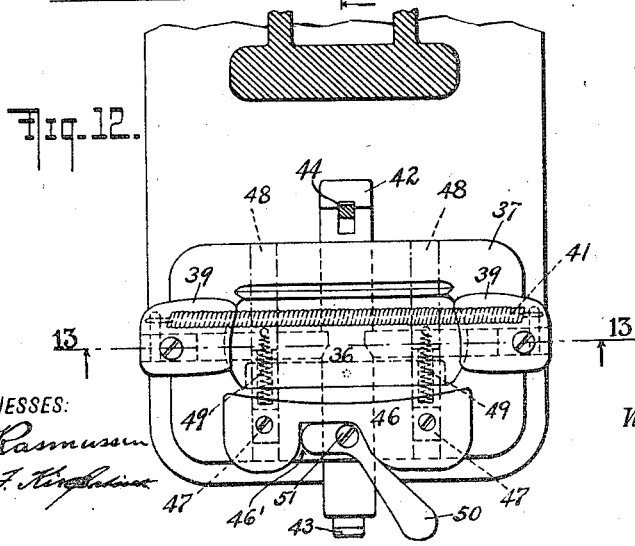
WITNESSES:
INVENTOR
WILLIAM P. DEVINE
BY
ATTORNEYS W. P. DEVINE.
APPARATUS FOR COVERING EYEGLASS CASES.
APPLICATION FILED MAR. 18, 1908.
1,049,344.
Patented Jan. 7, 1913.
4 SHEETS—SHEET 4.
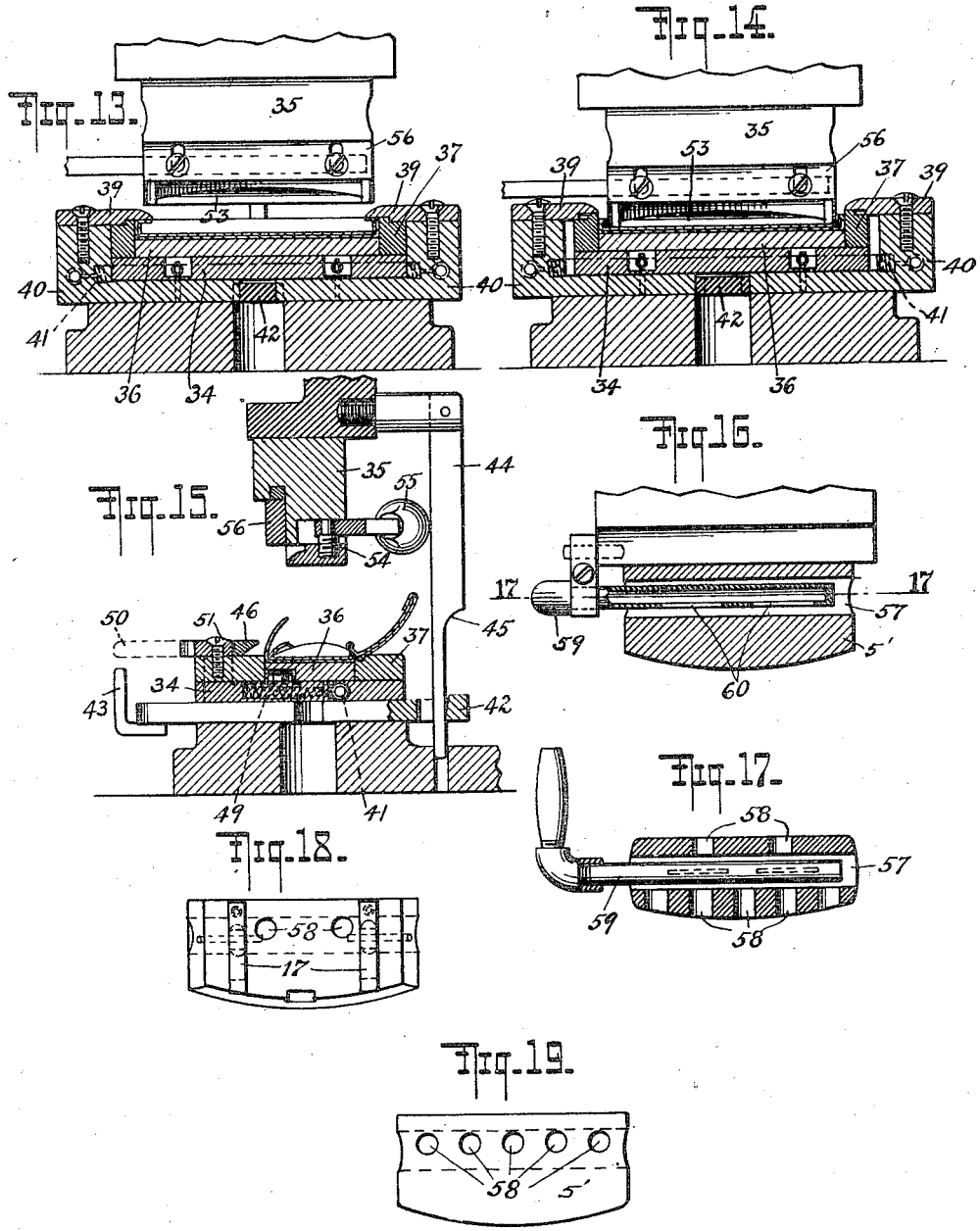
WITNESSES:
INVENTOR
WILLIAM P. DEVINE
BY
ATTORNEYS

UNITED STATES PATENT OFFICE.

WILLIAM P. DEVINE, OF DORCHESTER, MASSACHUSETTS, ASSIGNOR TO AMERICAN OPTICAL COMPANY, OF SOUTHBRIDGE, MASSACHUSETTS, A CORPORATION OF MASSACHUSETTS.

APPARATUS FOR COVERING EYEGLASS-CASES.

1,049,344.

Specification of Letters Patent. Patented Jan. 7, 1913.

Application filed March 18, 1908. Serial No. 421,961.

*To all whom it may concern:*

Be it known that I, WILLIAM P. DEVINE, a citizen of the United States, residing at Dorchester, in the county of Suffolk, State of Massachusetts, have invented new and useful Improvements in Apparatus for Covering Eyeglass-Cases, of which the following is a specification.

My invention relates to apparatus for and methods of covering spectacle or eyeglass cases or the like and consists in improved means and an improved method by which this operation can be performed quickly and effectively.

My invention will be best understood by reference to the following description when taken in connection with the accompanying illustration of one specific embodiment thereof, while its scope will be more particularly pointed out in the appended claims.

Figure 2:
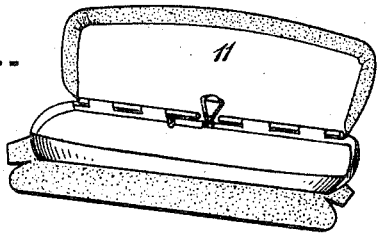
Figure 1:
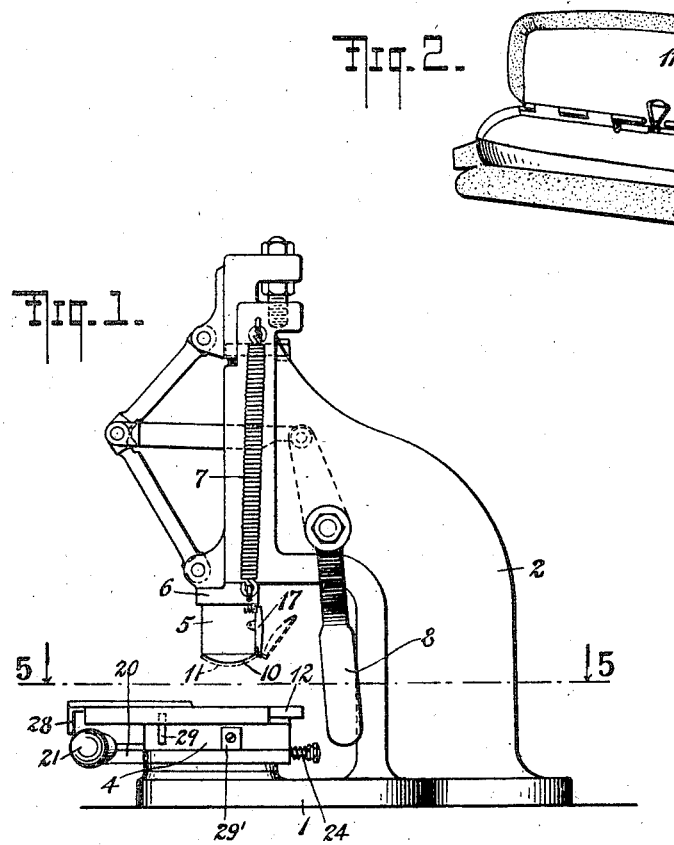
Figure 3:
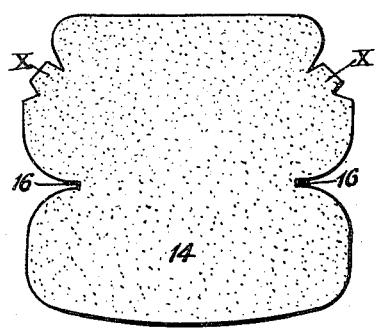

In the drawings Figure 1 shows an apparatus embodying one form of my invention and adapted to carry out my method; Fig. 2 shows a spectacle case with its covering partly applied; Fig. 3 is an outline plan view of a spectacle case covering; Fig. 4 is a front elevation of the machine shown in Fig. 1; Fig. 5 is a section taken on the line 5—5 of Fig. 1; Fig. 6 is a section taken on an enlarged scale longitudinally through the die on the line 6—6 of Fig. 5; Fig. 7 is a section in elevation taken on the line 7—7 of Fig. 5; Figs. 8, 9, and 10 are sections similar to that shown in Fig. 6 illustrating successive steps in the operation of covering an eyeglass case cover; Fig. 11 is a front elevation of an apparatus of modified form for carrying out a subsequent step in the covering operation; Fig. 12 is a plan view of the die and connected parts of the apparatus shown in Fig. 11, parts of such apparatus being shown in section; Figs. 13 and 14 are sections taken through the die shown in Fig. 12 on the line 13—13 of Fig. 12, illustrating successive steps in the operation of covering the body of the spectacle case; Fig. 15 is a vertical section on the line 15—15 of Fig. 11, showing the spectacle case in position on the die; Figs. 16, 17, 18 and 19 show a modified form of plunger which may be used in connection with the apparatus shown in Fig. 1 when it is desired to use a cement which requires heat; Fig. 16 being a sectional elevation of such plunger provided with a hollow chamber and with a gas pipe, Fig. 17 being a horizontal section on the line 17—17 of Fig. 16; and Figs. 18 and 19 being respectively front and rear elevations of the said modified form of plunger.

Referring to the drawings and to the embodiment of my invention which is there illustrated, I have shown (Fig. 1) a form of press, the particular construction of which is not material to my invention but which is used as a convenient means for getting the desired pressure between coöperating members of the apparatus. This press is provided with a base or bed 1, which is mounted upon any suitable support as a bench or table, and the upright or standard 2. Upon the bed 1 is suitably secured the die block 4, which is used in coöperation with a movable plunger 5 to press and cement the leather or other covering upon the article chosen, which, in the present instance, is an ordinary spectacle or eye-glass case represented in Fig. 2. The coöperating plunger 5 is secured to a vertically moving slide or cross head 6, which is mounted in and supported by the upright 2. This plunger is normally retracted to an upper position by the springs 7, but may be forcibly depressed with the application of considerable power, by suitable means such as the toggle connected hand lever 8. The under or active face of the upper and movable plunger 5 is shaped accurately to fit one side of the article to be covered, while the active face of the die is shaped accurately to fit the opposite side. In the present instance, the active face 10 of the plunger 5 is shaped to fit the generally concave inner face of the spectacle case cover 11 (Fig. 2). The block 4, which is fixedly secured to the bed, is provided with a depressible die center 13, which latter has an upper face concaved to fit the outer face of the spectacle case cover.

The sheet material for covering the spectacle case is cut into some such shape as is represented in Fig. 3 and the portion 14, which is intended for application to the case cover has applied to its inner surface a coating of cement or other suitable adhesive substance. The covering material usually employed is thin leather, although my invention is neither restricted to the material of the covering nor the character of the article to be covered. The cover is then laid down upon the face plate 12 with the cemented side up, the upwardly projecting pins 15 upon the face plate acting as gages to enter the notched portions 16—16 of the cover (Fig. 3) and quickly and accurately locating the requisite position of the sheet material. The sheet covering having been positioned, the spectacle case is fastened to the under face of the plunger 5 by any suitable means. In the present instance, the said plunger is provided at its back side with a pair of pivoted dogs or fingers 17 (Figs. 1 and 18) having depending notched ends which are pressed in and toward the side of the punch by springs at their opposite ends. When the case cover is pressed over the active face of the plunger, these notched dogs or fingers snap over the cover hinge as indicated in dotted lines in Fig. 1 and automatically retain the case in position beneath the plunger. With the spectacle case cover held below the plunger as described the plunger is then depressed by operating the handle 8 and the outer surface of the case cover forced down into firm adherence with the cemented covering lying over the die center beneath. The die center, which has the irregular plan outline shown in Fig. 5, has a grooved portion 18 extending between gage pins 15 into which groove fits the angular side or edge of the casing bottom adjacent the hinge, so that the cover and bottom lie as represented in Figs. 8 to 10, and the covering is also forced into adherence with the angular portion of the hinge.

The die center 13 is vertically slidable in the block 4, so as to be capable of depression from its uppermost position as shown in Fig. 6 to a position shown in Fig. 8, but is normally pressed upward by several relatively strong springs 3, assisted by the springs 19. The die center is formed with a downwardly projecting portion which is cut through to receive the sliding locking rod 20, which latter is slidably mounted in the block 4 and adapted to be moved in either direction by means of the pivoted hand lever 21. The lower side of the sliding locking rod is notched at 22, and into this notched portion there normally enters a part 23 of the movable die center when the latter is raised. When the plunger descends, the die seat is depressed into the position shown in Fig. 8, and the hand lever 21 being normally drawn toward the block 4 by a spring 24, the locking rod 20 immediately slides into the position shown in Fig. 8 where, until again retracted, it holds the die seat in its depressed position.

When the die center and the case cover are depressed below the upper face of the block 4, the marginal overlapping edges of the portion 14 of the sheet covering first cause the covering to be stretched or drawn tightly over the outer face of the case cover and are then laid up along the edges of the movable plunger 5 as represented in Fig. 8, so that when the plunger is allowed to recede, as it immediately is, these overlapping edges are left standing upturned. The friction between the cover and the face plate 12, together with the weight of the case, are sufficient to overcome the pressure of the springs of the dogs 17, so that, as the plunger ascends, the dogs release the cover which thus remains upon the die center 13. With the recession of the plunger 5, the overlapping (and now upturned) edges of the cover portion 14 are engaged preparatory to being turned over upon the inner edge of the cover by any suitable means. In the apparatus illustrated, there is provided for this purpose a sliding die plate 25 mounted to slide from the front toward the rear of the block 4 (Figs. 4 and 5) and adapted to be moved from the position shown in Fig. 8 to that shown in Fig. 9. The inner edge of the plate is beveled at both sides as shown at 26 and 26′, and is cut back at 27 (Fig. 5) to conform to the general configuration of the spectacle case cover. The cut away portion of the plate just receives the body of the plunger 5, so that when the plate is moved toward or to the die center, the plunger can pass through and below the same. It is, however, slightly smaller than the corresponding opening of the die, so that in its inward position, it slightly overhangs the edges of the opening in the die block 4 through which the plunger passes (see Fig. 9). The sliding plate has a down turned portion 28 at the front of the machine by which the operator can move it either inwardly or outwardly, and a stop-pin 29, adapted to abut against a block 29′ on the block 4 to limit the inward or rearward movement of the plate and leave it in the fixed and definite position shown in Fig. 9. When, therefore, the plunger is elevated, the operator moves the plate 25 from the position shown in Fig. 8 to that shown in Fig. 9, this movement causing the edge of the plate to pass over the upturned edge of the covering material. The handle 21 is then swung outwardly by the operator until the portion 23 of the die center can rise and enter the notch 22 in the locking member 20, this action permitting the die center to rise to the position shown in Fig. 9. This movement forces the flap of the covering against the slightly overlying edge of the die plate 25 and causes it to turn in all around as represented in Fig. 9 when the die center has reached its upper limit of movement. In order to allow the center to rise far enough, while preventing its rising so far as to cut or mar the flap cover by too great pressure against the overlying edge of the die plate, the center is provided with the depending threaded shank 9 on which are mounted the washer 30 and check nut 31. The washer is adjusted so that, when the center has risen to its proper position, the washer abuts against a portion of the block 4 as represented in Fig. 9. This permits its uppermost position to be located with the utmost precision. With the covering flap laid in over the inner edge of the cover as shown in Fig. 9, the plunger 5 is again depressed as shown in Fig. 10, causing the cement-coated covering flap to adhere firmly all around the edge of the case cover and leaving the covering material firmly applied to the case cover as represented in Fig. 2. The plunger being then again elevated and the plate 25 being pulled back to its original position, the handle 21 is swung outwardly to permit the rise of the center, and the spectacle case with the covering material applied to the cover is withdrawn from the machine for the next step of the operation. When the plunger with the attached case descends in the first instance, the edge of the case strikes the beveled tip of each gage pin 15. These pins project through an extension on the depressible die 13 and are carried upon the bar 32, the latter normally pressed upon against the under side of such extension by the springs 19. When the pins are engaged by the case the springs 19 yield and permit the depression of the pins flush with the surface of the depressible die, so that when the material is stretched or drawn over the cover there is no danger of its being torn through interference with the gage pins. The springs 19, however, are relatively weak so that they are ineffective to eject the case from the die and the pins with the bar 32 remain depressed so long as the case is positioned in the die.

For covering the body of the case, there is provided a die block 34 (Figs. 11 and 12) and a punch or plunger 35, both of which may be substituted respectively for the block 4 and the plunger 5 in the press shown in Fig. 1, or there may be provided a separate press exclusively for the said block 34 and plunger 35, in which the second step of the operation may be carried out. The die block 34 is shown mounted on a base plate 12. The plunger 35 is provided with an active face shaped to conform to the inside of the case body, as is best shown in Figs. 13 and 15. The die block is provided with the seat plate 36 (Figs. 13 to 15) the active or upper face of which is shaped to conform to the exterior of the case body, and surrounding the seat plate is the marginal die member or plate 37, which is so cut or formed as to properly receive but fit about the body of the case. With the case covered to the extent described in the first step of the operation, the portion of the covering, which is to underlie the body of the case, is covered with an adhesive coating and the operator then places it bottom down (Fig. 15) in the die. By forcing the case into the depression within the marginal member 37 the marginal edges of the covering are caused to be drawn or wiped up and over the sides of the case, leaving them standing upright. Mounted to overlap the marginal face plate of the die and at each end thereof is a sliding wiping plate 39, having a suitably formed wiping edge for engagement with the upturned edges of the leather or other covering material. These plates are fastened to the opposite upturned ends of the slides 40, which latter are normally drawn together by the spring 41. Preparatory to placing the first eye glass case in the die the operator pushes in a sliding wedge rod 42, which latter has an upturned end 43 directly at the front of the die and suitably formed inclines (Fig. 12) beneath the die for engagement with the slides 40 so that when the wedge is pushed in the slides are separated, causing the wiping plates 39 to retract into the position shown in Fig. 14. After the case has been inserted in the die with the cover turned forward on its hinge in order to give the necessary looseness at the back of the hinge, the cover is thrown back and the wedge 42 is retracted by the operator allowing the spring to draw the wiping plates 39 toward each other causing them to advance and lie in the projecting marginal edges of the leather, as represented in Fig. 13, this movement also serving to wipe the leather up smoothly and tightly at the ends. Abutments formed upon the plate 37 limit the inward movement of the wipers and bring them to rest where desired.

Before describing the further operation of the parts which serve to fold the material over the sides of the body or pocket of the case, I will describe the parts which serve to fold the material over the front or lip of the case or pocket.

As shown in Figs. 12 and 15, a plate 46 is arranged to slide upon the upper face of the plate 37. This die plate is attached by suitable means to the upturned edges of two slides 47 which are arranged to slide in grooves 48 in the die plate 34. These slides are normally pushed in the direction away from the lip of the case by suitable springs 49—49. The edge of the die plate 46 nearest the lip is beveled or undercut so as to conform approximately in shape to the outside of the lip. By means of lever 50 pivoted at 51 and working in a depression 46' in the die plate, the die plate may be pushed against the lip so as to fold down the material upon the outside of the lip. This operation is performed preferably after the material has been folded over the ends of the pocket as just described. As the short arm of the lever is thrown around until it assumes a position substantially perpendicular to the bottom of the depression 46' in which it operates, the die plate 46 will remain in contact with the lip until the operator again throws back the lever. A flat spring 52 may be attached at its center to the die plate 34 and so arranged that its ends press upon the slides 47. The pressure of this spring will cause the die plate 46 to press downwardly upon the lip as it rides up against the lip. The plunger 35 is provided with a shoe 53, pivoted at 54, and adapted to be swung forward by a lever 55. The forward edge of this shoe is adapted to fit between the bottom of the pocket and the inside of the lip. The plunger is furthermore provided with a stepped extension 56 just above the front of the shoe. The purpose of this will be hereafter explained.

The description of the operation of the various parts will now be continued. After the material has been wiped tightly over the ends as already explained, the operator first wipes up by hand the tabs X X of the material upon the lips and then by means of lever 50 draws the beveled edge of the sliding die plate 46 against the outside of the lip of the pocket. The flat spring 52 will, as already explained, draw the beveled edge downward upon the lip, so that such downward movment, in combination with the forward movement of the die plate, will produce a compound motion by which the material will be properly stretched and pressed upon the lip. As already explained, the sliding die plate will remain locked upon the lip. Thereupon the plunger 35 is depressed and enters the pocket, drawing the material into firm adherence with the inner sides of the end portions of the pocket and also with the inner edge of the lip. When the plunger begins its descent, the wiper plates are lying in its path. The plunger, however, is provided with an arm 44 (shown in Fig. 15) having a beveled end 45; this arm passes through an aperture in the rear end of the wedge rod 42, and before the plunger reaches the wiper plates, the beveled end of the arm engages the wedge rod and throws it inwardly into the position so that the wiper plates are retracted out of the path of the plunger. The wiper plates have pressed the material so closely against the metal edges of the pocket that the material remains in the folded position for a sufficient length of time after the removal of the wiper plates to remain in the path of the plunger and be pressed by it firmly upon the inside of the case. As the punch enters the pocket, the stepped extension 56 presses upon the top of the inner edge of the sliding die plate 46. The operator now throws forward the shoe by means of the lever 55, thus causing it to enter the space beneath the lip of the pocket, and to fold under the material and press the same against the under side of said lip. As considerable pressure is exerted upon the hand lever 55, the stepped extension 56 is arranged upon the plunger in order to prevent a straining or distortion of the lip of the sliding die plate 46. The material has now been cemented upon the case. In order to release the case, the shoe 53 is thrown back by means of the lever 55, thus permitting the plunger to be raised. By means of the lever 50 the sliding die plate 46 is withdrawn from the case; the covered case may thereupon be removed from the die. The machine is now ready for the covering of another case.

As some cementing material may be applied to metal only under the influence of heat, I have shown in Figs. 16 to 19 a modified form of plunger provided with a heating chamber and heating means. The particular form of plunger shown is adapted for use in applying the material to the cover of the case, but any one skilled in the art may apply the same modification to the plunger 35. The plunger 5' is provided with a chamber 57, provided with anterior and posterior ventilating apertures 58—58. Into this chamber combustible material, such as ordinary illuminating gas, is conducted by means of a pipe 59, provided with openings 60 and connected with an ordinary burner by means of any suitable flexible connection. Fig. 18 shows a rear view with dogs 17 in position. Fig. 19 shows a front view of the plunger.

While the invention has been described in connection with its application to the covering of eye glass cases, it will be understood that with slight modification it may be employed in connection with the covering of other articles. It will also be understood that the invention is not limited to the details of construction or the form or relative arrangement of parts described, but that extensive modifications may be made therein without departing from the spirit of the invention.

I claim as my invention:

1. A machine for covering eye-glass cases or the like comprising a plunger, a die, movable means to engage the marginal edges of the covering and turn them under the plunger, and means actuated by said plunger to retract said movable means in advance of the depression of said plunger.

2. A machine for covering eye-glass cases or the like comprising a plunger, a die, movable means to engage the marginal edges of the covering and turn them under the plunger, and means attached to said plunger and adapted to retract said movable means in advance of said die and as said die is depressed.

3. A machine for covering eye-glass cases or the like comprising a plunger, a die, a pair of wiping members adapted to overlie the edges of the die and engage the covering material thereat, means coöperating with said plunger and adapted to retract said wiping members in advance of said die and as said die is depressed, and manual means to restore said members to their overlying position.

4. A machine for covering eye-glass cases or the like, comprising a plunger, a die, a die plate slidable in a plane crossing the plunger axis and provided with an undercut edge adapted to engage the lip of the case, and means for drawing said plate at an angle to its plane of slide and toward the case as said under cut edge comes in contact with said lip.

5. A machine for covering eye-glass cases or the like comprising a plunger, a die, a die plate provided with an undercut edge and adapted to be slid in a plane crossing the plunger axis and toward the free edge of the lip so as to bring said undercut edge against said lip and to both stretch and press the covering material thereon, and means for drawing said plate at an angle to its plane of slide and toward the case as said undercut edge comes in contact with said lip.

In witness whereof I have hereunto subscribed my name, this 14th day of March, 1908, in the presence of two subscribing witnesses.

WILLIAM P. DEVINE.

Witnesses:
GEO. V. RASMUSSEN,
FRITZ V. BRIESEN.